US005572594A

United States Patent [19]

[11] Patent Number: 5,572,594

Devoe et al.

[45] Date of Patent: Nov. 5, 1996

[54] EAR CANAL DEVICE HOLDER

[76] Inventors: Lambert Devoe, 610 First St., Coronado, Calif. 92118; Seth Silverstein, 763 N. Kenter Ave., Los Angeles, Calif. 90049; Robert Hershenfeld, 460 Driggs Ave., Brooklyn, N.Y. 11211; Alan Devoe, 610 First St., Coronado, Calif. 92118

[21] Appl. No.: 312,701

[22] Filed: Sep. 27, 1994

[51] Int. Cl.$^{6}$ .................................................... H04L 25/00

[52] U.S. Cl. ............................ 381/68.6; 381/69; 181/130

[58] Field of Search .............................. 381/23.1, 25, 67, 381/68, 68.1, 68.2, 68.3, 68.4, 68.5, 68.6, 68.7, 69, 69.1, 183, 187; 181/129, 130, 131, 135; 128/864, 865, 867, 868; 2/209

[56] References Cited

U.S. PATENT DOCUMENTS

| | | | |
|---|---|---|---|
| 4,834,927 | 5/1989 | Birkholz et al. | 264/134 |
| 4,880,076 | 11/1989 | Ahlberg et al. | 181/130 |
| 4,945,569 | 7/1990 | Kulman | 381/68.6 |
| 4,962,537 | 10/1990 | Basel et al. | 381/68.6 |
| 5,006,055 | 4/1991 | Lebisch et al. | 425/2 |
| 5,008,058 | 4/1991 | Hennberger et al. | 264/134 |
| 5,068,902 | 11/1991 | Ward | 381/68.6 |
| 5,113,967 | 5/1992 | Killion et al. | 181/135 |

*Primary Examiner*—Curtis Kuntz
*Assistant Examiner*—Huyen D. Ie
*Attorney, Agent, or Firm*—Fuess & Davidenas

[57] ABSTRACT

An ear canal device holder for devices other than speaker/microphone amplification systems that am to be inserted into the canal of the human ear. The device holder is made of a flexible silicone material comprising a body and structural support element(s) such that the device is held within the body of the holder and the body and device are secured in the ear by the structural element(s). In addition the device holder minimizes the attenuation of sound waves that pass through the ear canal to the tempanic membrane, while maximizing comfort and secure fit.

7 Claims, 12 Drawing Sheets

EAR CANAL DEVICE HOLDER

BACKGROUND OF THE INVENTION

1. Field of Invention

This invention relates to a housing mechanism that allows devices to be inserted into the canal of the human ear.

2. Discussion of Prior Art

Hearing aids are the most commonly inserted devices into the human ear. Hearing aids amplify sound to hearing impaired individuals through a microphone/speaker amplification system and are typically contained in housings that are molded to the user's ear, known as earmolds. Earmolds are created by taking an impression of the concha and car canal and then making a plastic shell that matches the user's ear shape. The housing contains the hearing aid electronics as well as a vent tube that connects the users tempanic membrane (ear drum) to the open air. Such a vent tube allows low frequency noise to leave the ear canal: too little venting causes the patient's voice to seem too loud, too much venting can cause acoustic feedback, a process by which amplified sound from the receiver (speaker) travels back to the microphone and is amplified again, resulting in a high pitched whine. Several U.S. patents pertain to methods for creating hearing aid housing devices; relevant prior art includes U.S. Pat. Nos. 4,880,076 (1989), 4,834,927 (1989), 4,962,537 (1990), 5,006,055 (1991), and 5,008,058 (1991).

Hearing aid earmolds are designed to attenuate sound waves to the tempanic membrane. In each of the methods cited above the earmold housing was designed to accommodate hearing aid devices that have both a speaker and a microphone where feedback has been the major design obstacle. In each patent the housing mechanism has been designed to prohibit sound waves from passing through the ear canal to the tempanic membrane, except through the microphone-speaker amplification system. To accomplish the sound wave attenuation, earmolds are often individually molded objects that snugly a user's entire ear canal.

The disadvantage of these approaches is that they limit the application of the earmold to hearing aid or other microphone/speaker amplification systems. Use of earmolds to house devices other than speaker/microphone amplification systems in individuals who have normal hearing capabilities would prohibit sound waves from entering the human ear thereby impair hearing.

Earmolds are also difficult to fit. Because of the need to eliminate feedback by filling the entire ear canal, each earmold must fit an individual user's unique ear shape.

The need to conform exactly to an individual's unique ear canal size and shape, prohibits mass production; the wide variance in human ear canal size and shape and the need to occupy the entire canal prohibits the design of a "one size fits all" earmold.

Another disadvantage of earmolds is the difficulty in creating a fit that secures the device firmly within the ear canal. U.S. Pat. No. 4,880,076 addresses this problem by encasing the device with a compressive foam sleeve. The disadvantage of this housing method is that it requires that the device be "substantially cylindrical," touching all points of the ear canal in the area in which the device sits. Such a method for holding devices necessarily prohibits the passage of sound waves to the tempanic membrane for devices other than speaker/microphone amplification systems.

Earmolds also have difficulty providing a comfortable fit. The feedback problem has limited the type of materials that can be used to create earmolds. Earmolds that are made of Silicone, while soft, flexible and comfortable, do not totally block high frequency wave transmission. Consequently, harder, less comfortable otoplastics have been used in the fabrication of ear molds.

SUMMARY OF THE INVENTION

In accordance with the present invention an ear canal device holder includes a body, typically formed by an injection or dipping process, having a size smaller than the ear canal. The body is suitable to substantially contain within itself a device much smaller than the ear canal.

A structural element is integrally formed with the body so that said body and said structural element are monolithic. The structural element protrudes radially from the cross sectional center of said body in a direction that is substantially radial from the center of the cross section of the center of the body and of the ear canal when the monolithic body and structural element are positioned within the ear canal. The structural element has a cross sectional height that is greater than or equal to the distance from the nearest edge of the body to the farthest cross sectional edge of the ear canal as the body rests against the opposite edge of the ear canal within the ear canal. The structural element has, a thickness and structural strength that will secure the weight of the device within the ear canal. It has a length that is approximately the length of said body. Finally, the structural element subtends in circumferential angular extent less than $1\pi$ radians about the cross-sectional center of said body and of said ear canal.

The structural element therein secures the body and any device contained within said body in the ear canal by exerting a force against the inner surface of the ear canal that opposes an equal but opposite force on the body against the opposite inner surface of the ear canal. The integral structural element and body can be freely inserted into an external ear canal of the user and become wedged in the canal as the body and structural element press against the inner surface of the ear canal. Because the structural element subtends less than half the total $2\pi$ radians about the cross-sectional center of said body and of said ear canal, ample room is provided for sound to travel in ear canal past said monolithic structural element and body, and past any device contained within said body.

Accordingly, several objects and advantages of our invention are:

a) To provide a housing mechanism for devices to be held in the ear canal, that minimizes the interruption of sound waves that pass through the ear canal to the tempanic membrane.

b) To provide a housing mechanism for devices to be held in the ear canal, that does not prohibit the passage of sound waves through the ear canal to the tempanic membrane.

c) To provide a housing mechanism for devices to be held in the ear canal, that fits easily into any individual's ear canal.

d) To provide a housing mechanism for devices to be held in the ear canal, that is able to function properly in a variety of ear canal sizes and shapes.

e) To provide a housing mechanism for devices to be held in the ear canal, such that the force exerted on the era canal by the holding device is strong enough to keep the entire device secure within the canal.

f) To provide a housing mechanism for devices to be held in the ear canal, that holds such devices securely while minimizing the obstruction of sound waves passing through the ear canal to the tempanic membrane.

g) To provide a housing mechanism for devices to be held in the ear canal, that holds such devices securely within the ear canal and can fit into any individual's ear canal.

Further objects and advantages are to provide a housing mechanism that adequately secures devices that are to be inserted into the human ear canal, while minimizing the disruption of passing sound waves to the tempanic membrane, maximizing comfort to the user, and maximizing the variance of sizes and shapes of ear canals into which the device may be inserted. Still further objects and advantages will become apparent from a consideration of the ensuing descriptions and drawings.

BRIEF DESCRIPTION OF THE DRAWINGS

The reference numerals and corresponding elements in the drawings are as follows.

10 concha

12 ear canal

Figure 1A:
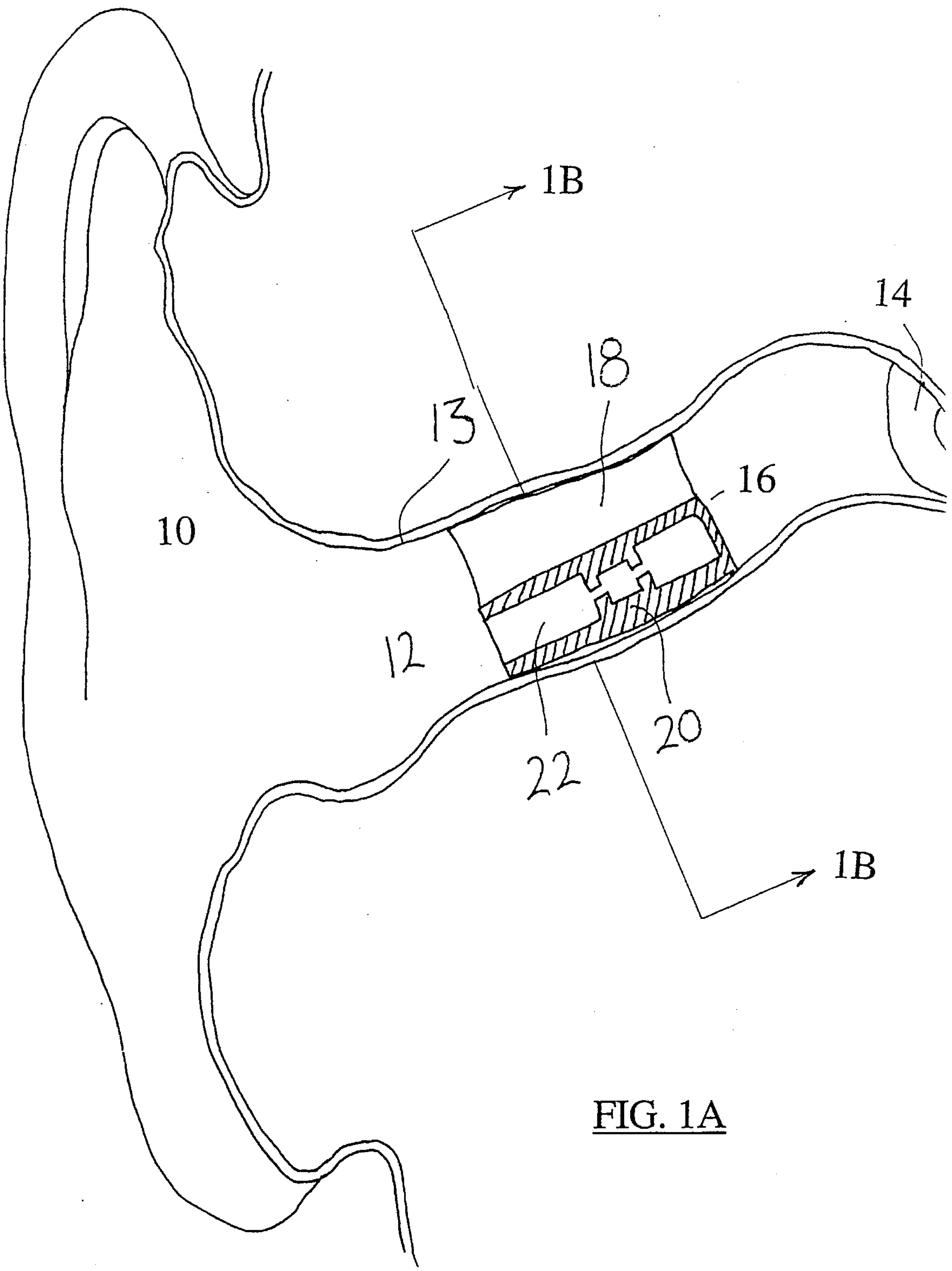
FIG. 1A shows a sectional view of a human ear canal into which a first embodiment of a device holder and device has been inserted.
Figure 1B:
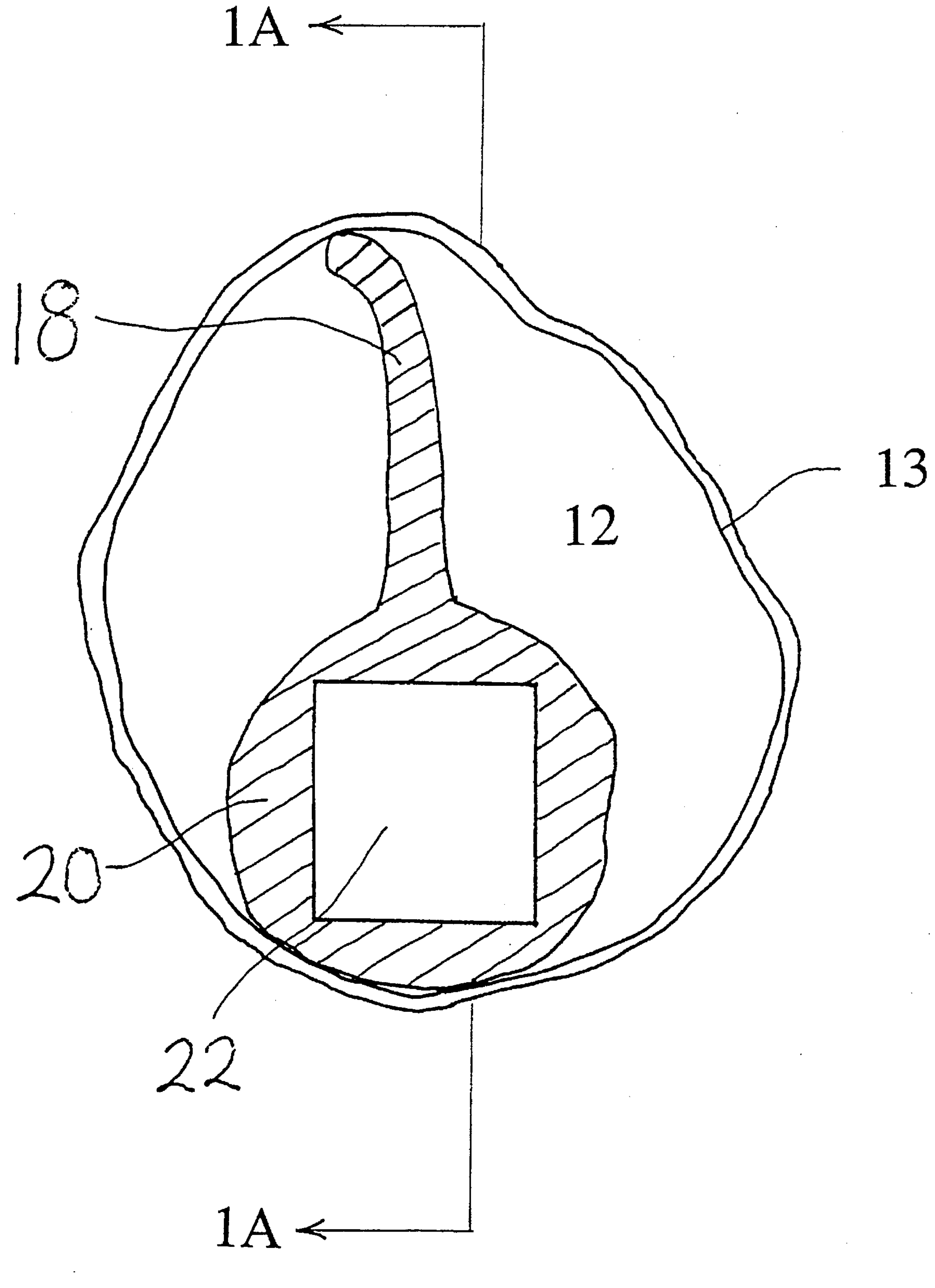
FIG. 1B shows a view of the ear canal and the first embodiment of device holder from outside the human head looking into the human ear.
Figure 1C:
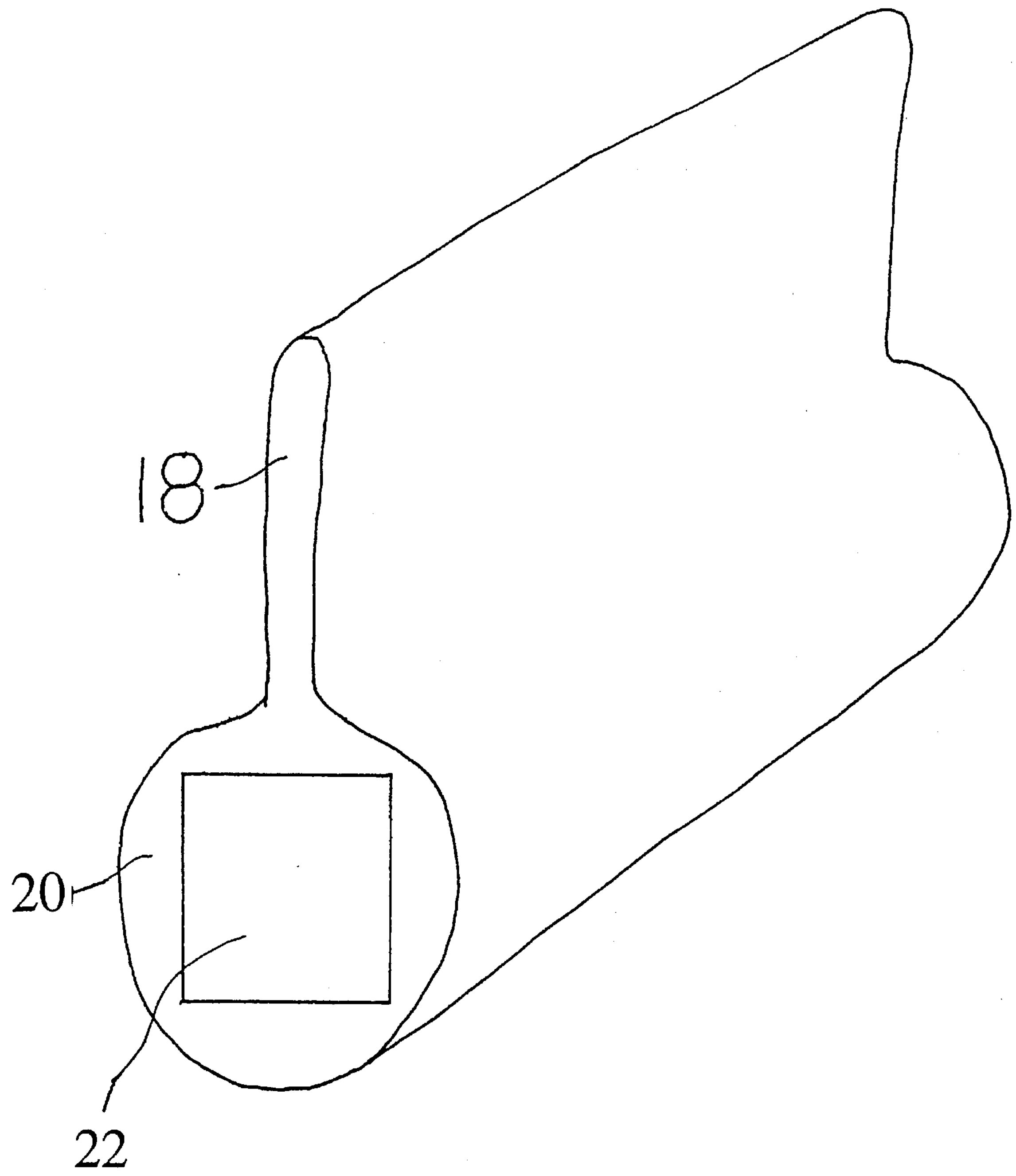
FIG. 1C shows an axonometric view of the first embodiment of the device holder of invention.
Figure 2A:
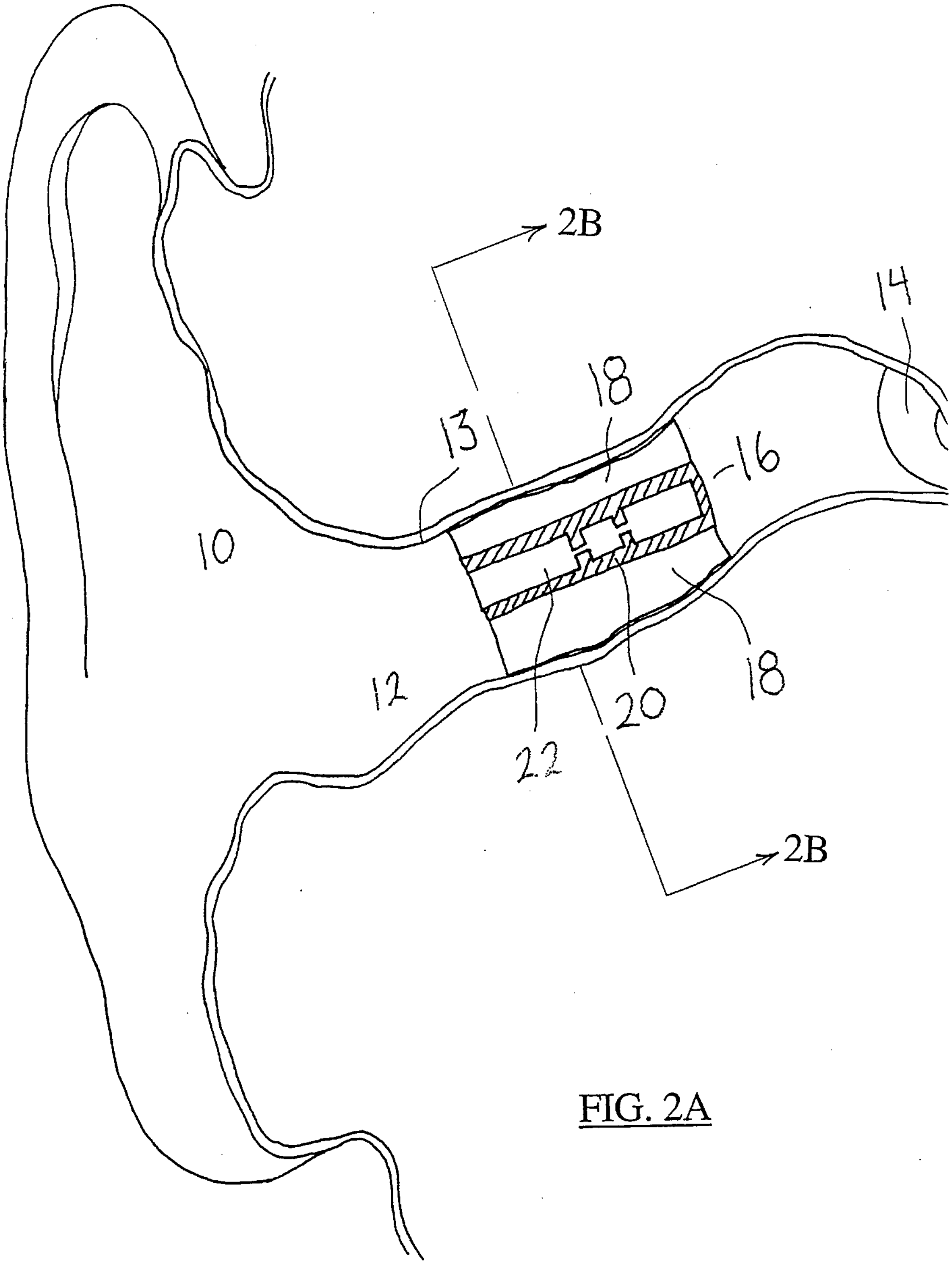
FIG. 2A shows a sectional view of a human ear canal into which a second embodiment of a device holder has been inserted.
Figure 2B:
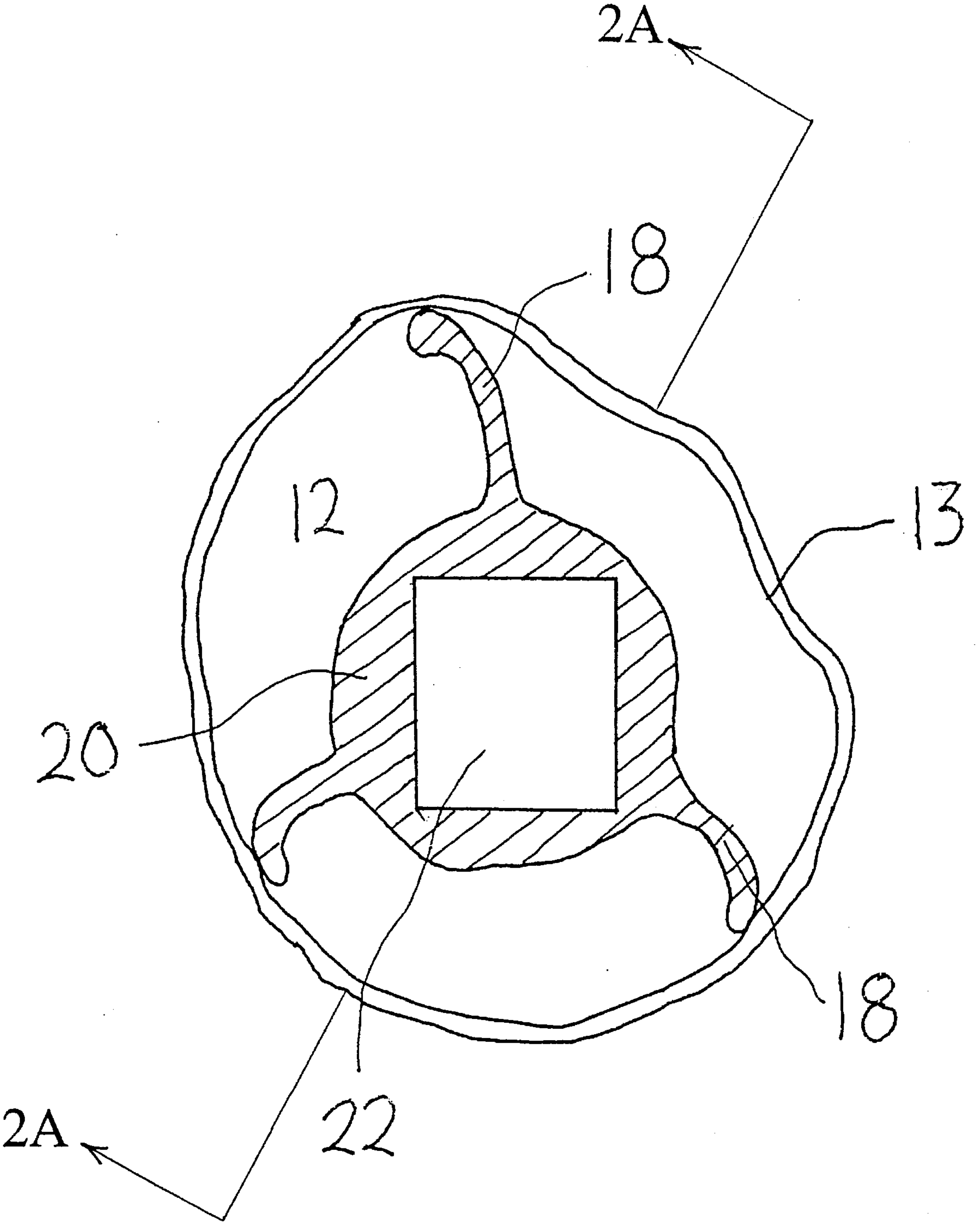
FIG. 2B shows a view of the ear canal and the second embodiment of the device holder from outside the human head looking into the human ear.
Figure 2C:
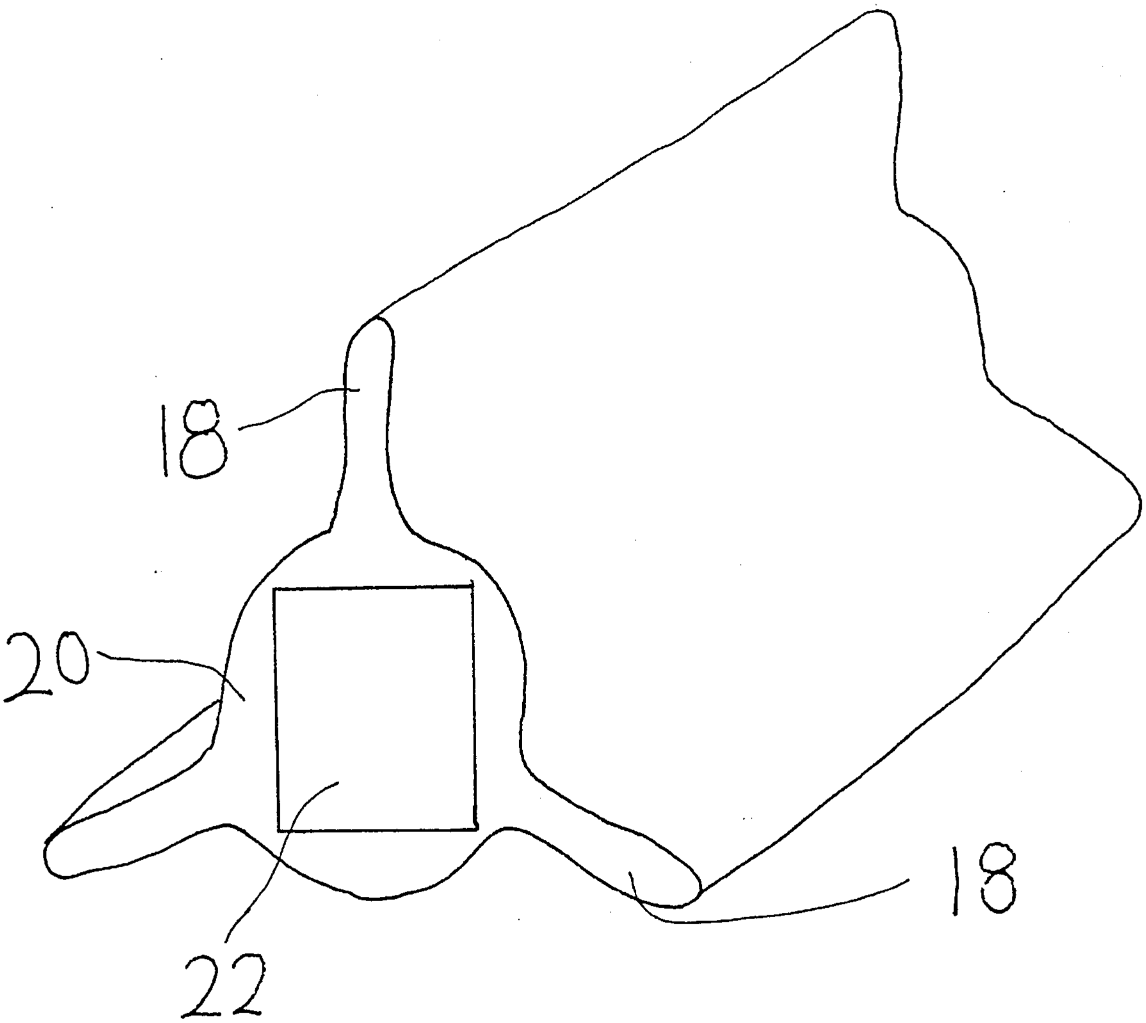
FIG. 2C shows an axonometric view of the second embodiment of the device holder of invention.
Figure 3A:
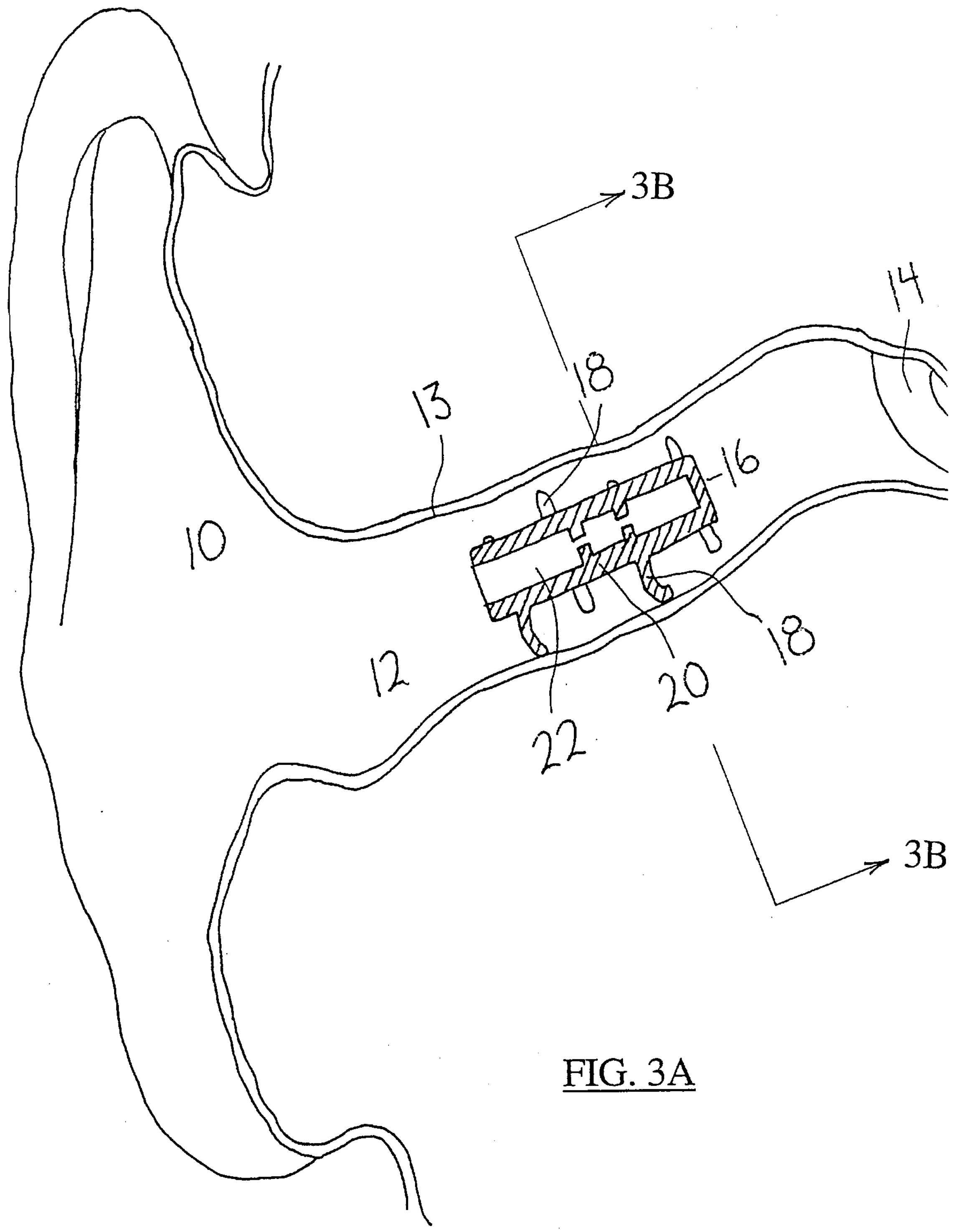
FIG. 3A shows a sectional view of a human ear canal into which a third embodiment of a device holder has been inserted.
Figure 3B:
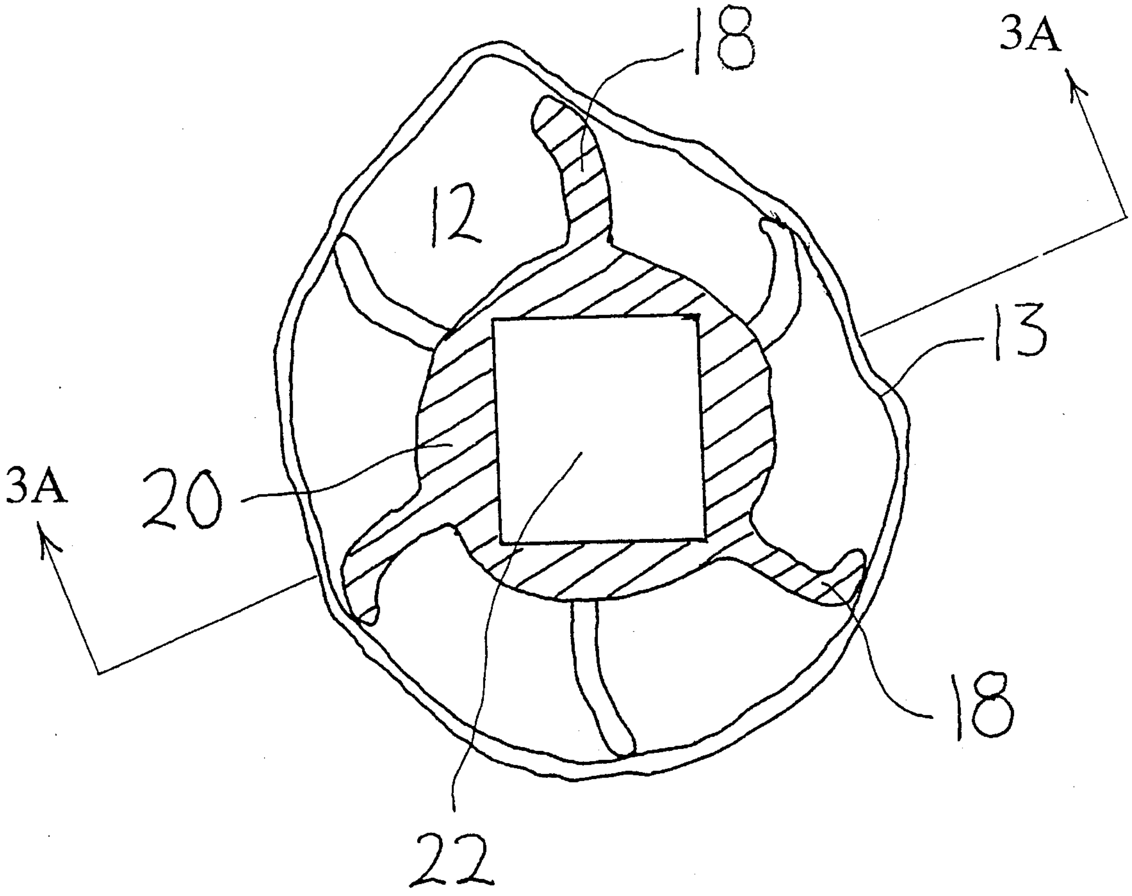
FIG. 3B shows a view of the ear canal and the third embodiment of the a device holder from outside the human head looking into the human ear.
Figure 3C:
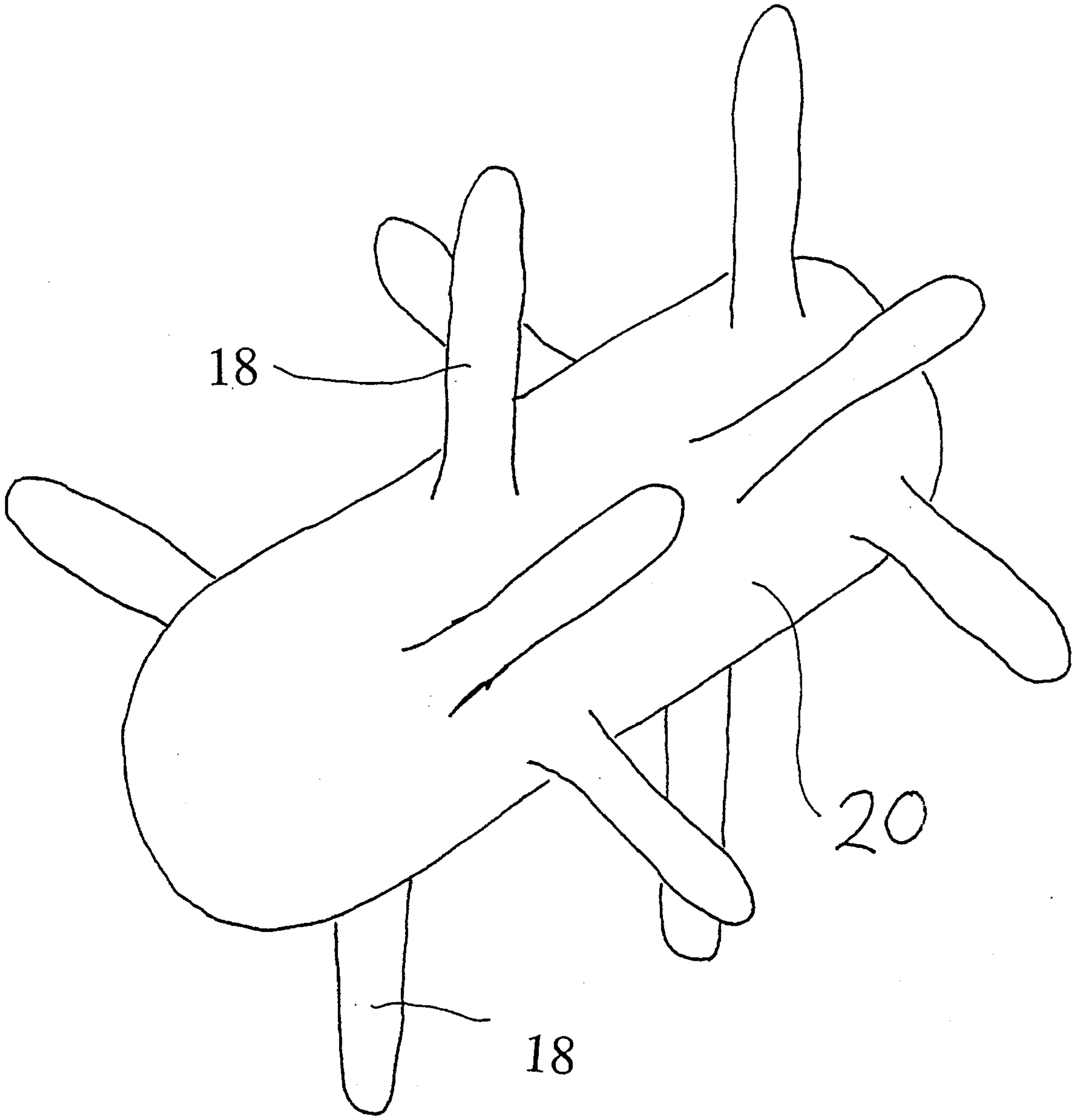
FIG. 3C shows an axonometric view of the third embodiment of the device holder of invention.

13 inner surface of the ear canal

14 tempanic membrane

16 holding mechanism

18 structural element (embodiment 1,2,3)

19 structural element (embodiment 4)

20 body

22 inserted device

DESCRIPTION OF THE PREFERRED EMBODIMENTS

In the first embodiment, figures one shows a sectional view of a human ear canal into which the device holder has been inserted. The device holder (16) comprises a body (20) that houses the components of the device schematically indicated by (22) and a structural element (18) that is connected to the body and acts to secure the device and body within the ear. In the current embodiment, the components of the device to be inserted into the ear (which may for example be a telephone receiver or a signal receiving unit) are embedded within the holding mechanism (16) using an injection or a dipping method. The holding mechanism (16) may also be pre-formed with a hollow duct that is able to receive and hold a separately assembled device.

In the first embodiment the holding devices comprises one structural element (18) that emerges from the body (20) in a substantially radial direction to that of the center of the device. Such a structural element extends to a distance beyond the boundary of the ear canal so that the device is held by the pressure of the structural element against the inner surface of the ear canal (13) when inserted. Those skilled in the art will notice that the shape and placement of the structural element can vary.

Those skilled in the art will also notice that more than one structural element can be used. In the second embodiment shown in figures two, three structural elements (18) emerge from the body of the device holder (20) extending to a distance beyond the boundary of the ear canal (12). When inserted into the ear canal the device holder is held by the force of the structural elements against the inner surface of the ear canal.

In a third embodiment, figures three shows a number of structural elements (18) that emerge like fingers, radially from the body of the holding device (20) to a distance outside the boundary of the inner ear canal. When inserted into the ear canal the device holder is held by the force of the structural elements against the inner surface of the ear canal. These fingers are attached monolithically to the body of the device holder in a radial direction to the center of the end of the device.

Figure 4A:
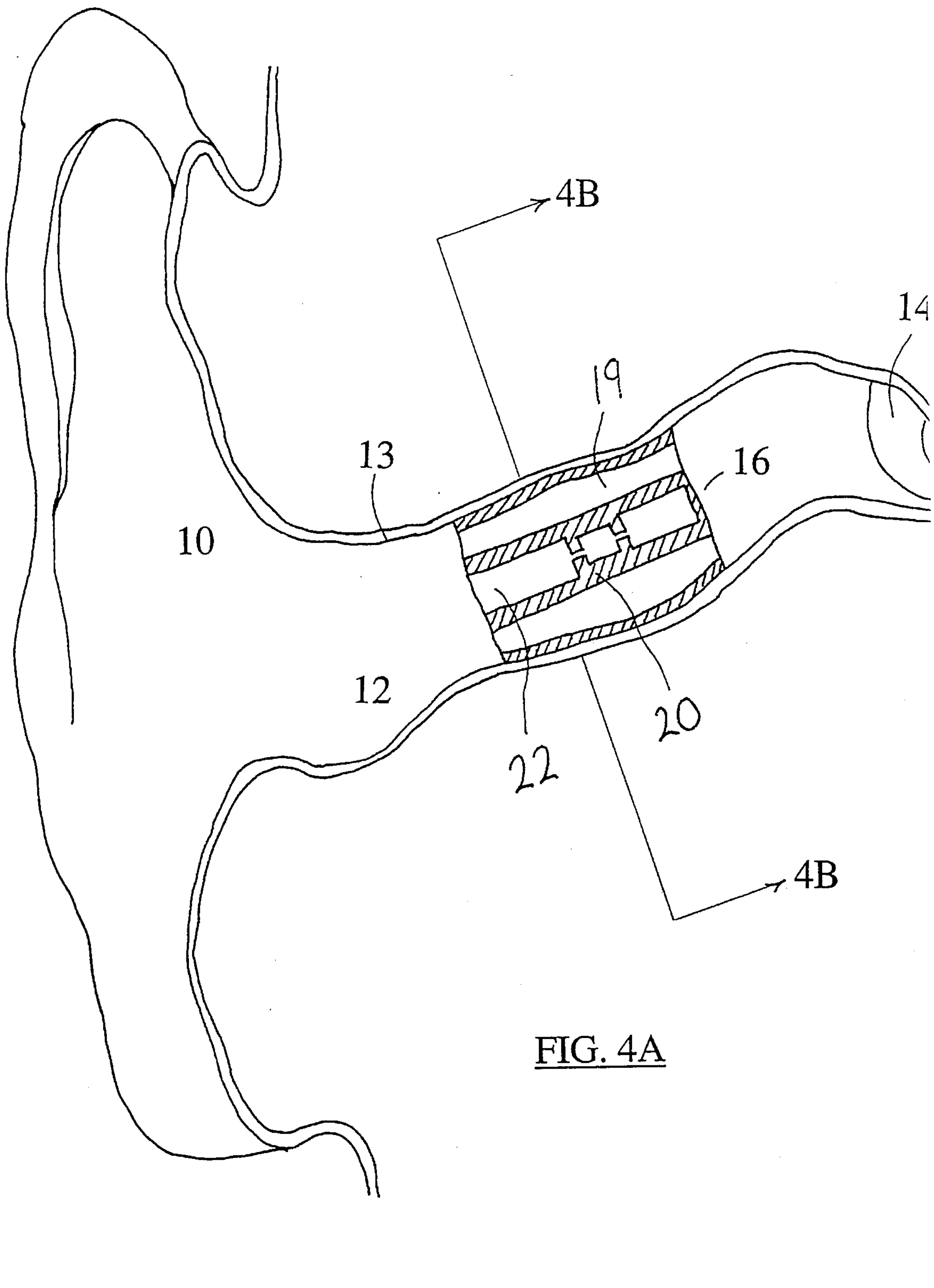
FIG. 4A shows a sectional view of a human ear canal into which a fourth embodiment of a device holder has been inserted.
Figure 4B:
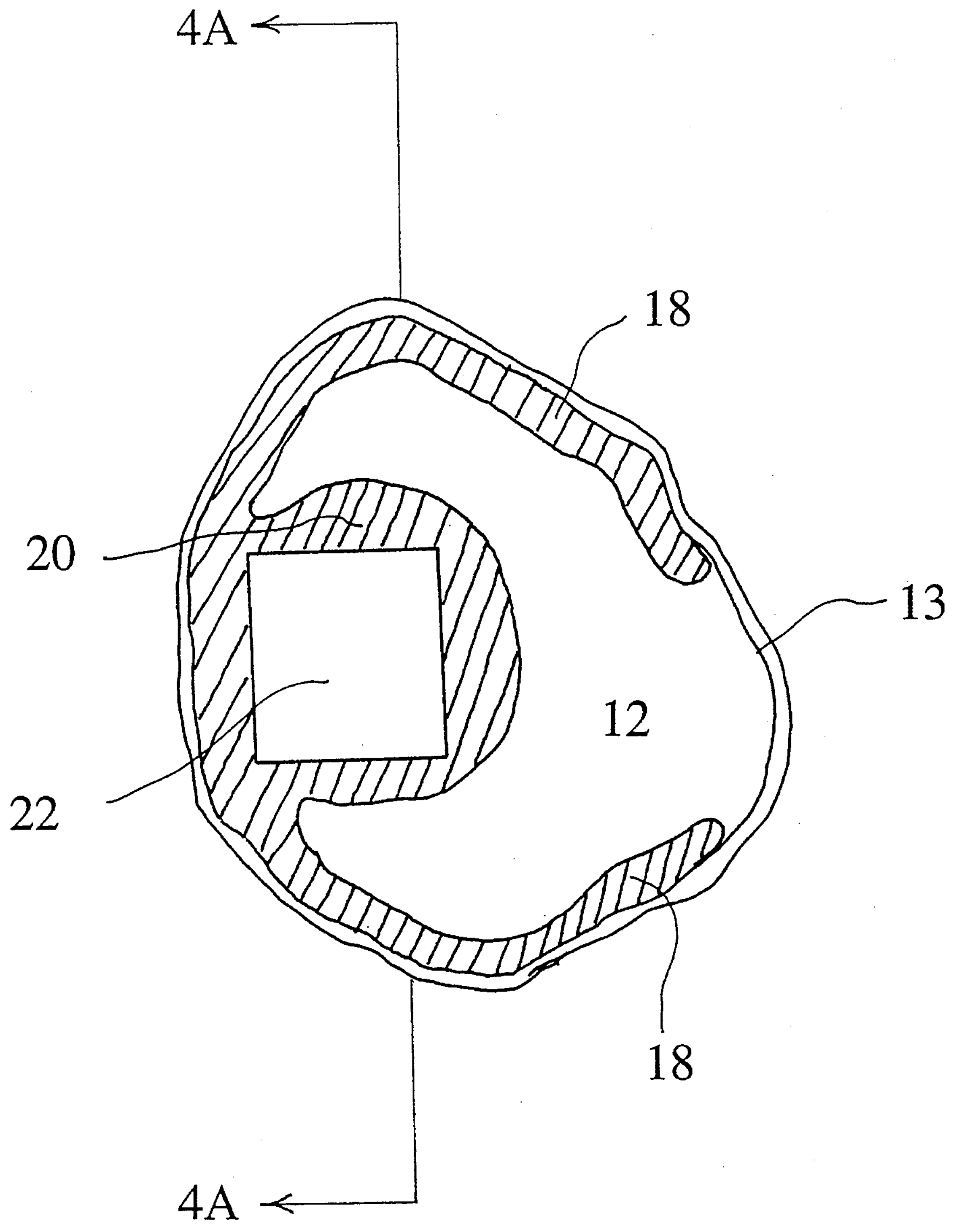
FIG. 4B shows a view of the car canal and the fourth embodiment of the device holder from outside the human head looking into the human ear.
Figure 4C:
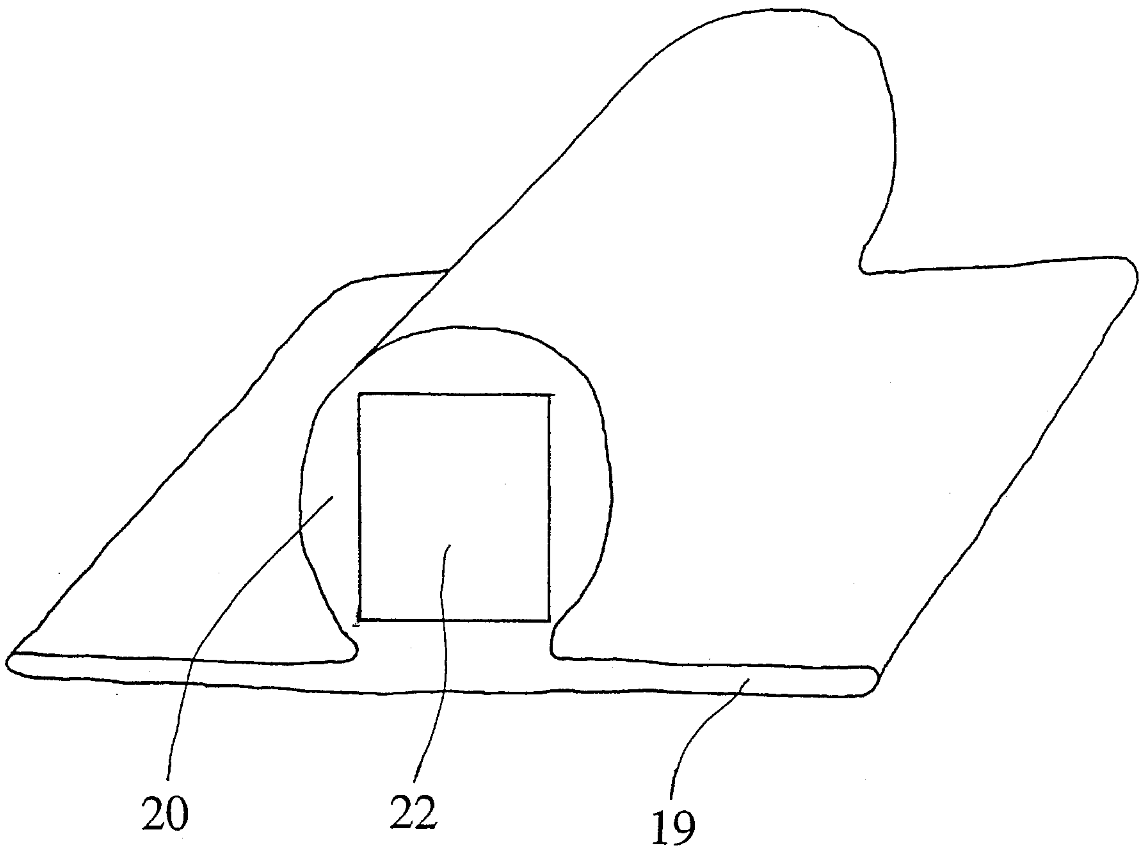
FIG. 4C shows an axonometric view of the fourth embodiment of the device holder of invention in its natural position.

In the fourth embodiment, FIGS. 4 show a device holder that is also comprised of a body (20) and a structural element (19). In the current embodiment, the structural element is a plane of material that attaches to the edge of the body of the device holder such that it's resting position is perpendicular to the radius from the center of the end of the device where the plane of material attaches (FIG. 4C). The shape of the material will tend to be rectangular with a size governed by a width that generally will not exceed the circumference of the ear canal and a length that generally will not exceed the length of the device.

In all four embodiments, the structural elements (18) that protrude from the body of the holding device (20) may be formed as a part of the injection or dipping process. The holding devices preferably consists of a cold-vulcanized silicon rubber.

The manner of using the device holder is similar to that of earmolds currently in use in the hearing aid industry. The device to be secured in the ear is either joined with the device holder as a part of the injection or dipping process, or it is inserted into a hollow duct within the device holder after manufacturing. The holder and device are then inserted into the ear canal of the user such that the structural elements press against the inner surface of the ear canal thereby securing the fir of the device and holder. In addition the housing mechanism minimally attenuates sound waves through the ear canal. In the forth embodiment the user must wrap the plane of material around the device prior to inserting it into the ear canal; once inside the canal the plane of material will tend to unwrap toward its natural planar shape, thereby fitting the device securely. In each embodiment the device and holder are placed in the ear canal such that they minimally interfere with the passage of sound waves to the tempanic membrane and so as to provide a secure and comfortable fit.

Thus the reader will see that the device holder provides a method for securing any device that does not require attenuation (devices other than a microphone/speaker amplification systems for example) but must be placed within the canal of the human ear in a comfortable, secure fashion.

While the above description contains many specificities, these should not be construed as limitations on the scope of the invention, but rather as an exemplification of three preferred embodiments thereof. Many other variations are possible. For example the housing device could have two structural elements, or more or less figures. Accordingly the scope of the invention should not be determined by the embodiments illustrated, but by the appended claims and their legal equivalents.

We claim:

1. An ear canal device holder comprising:

a body smaller than the ear canal that is suitable to substantially contain within itself a device much smaller than the ear canal;

a structural element that is integrally formed with said body so that said body and said structural element are monolithic, said structural element protruding substantially radially from a cross sectional center of said body and of said ear canal when said monolithic body and structural element are positioned within the ear canal, having a cross sectional height that is greater than or equal to the distance from the nearest edge of the body to the farthest cross sectional edge of the ear canal as the body rests against the opposite edge of the ear canal within the ear canal, a thickness and structural strength that will secure the weight of the device within the ear canal, a length that is about the length of said body, and subtending in circumferential angular extent less than 1π radians about the cross-sectional center of said body and of said ear canal;

where in said structural element secures said body and any device contained within said body by exerting a force against the inner surface of the ear canal that opposes an equal but opposite force on the body against an opposite surface of the ear canal;

where in said integral structural element and body can be freely inserted into an external ear canal of the user and become wedged in the canal as the body and structural element press against the inner surface of the ear canal; and wherein because the structural element subtends less than half the total 2π radians about the cross-sectional center of said body and of said ear canal, ample room is provided for sound to travel in said ear canal past said monolithic structural element and body, and past any device contained within said body.

2. The ear canal device holder as defined in claim 1 wherein said device holder further comprises:

an additional integrally formed structural element so that said plural structural elements and said body are monolithic and so that said structural elements protrude from said body in a direction that is substantially radial from the center of the cross section of the ear canal, to an equal distance that is greater than or equal to the distance to the inner ear canal so that said device and said body are held tight and secure within said ear canal.

3. The ear canal device holder as defined in claim 1 wherein said device holder further comprises:

an additional integrally formed structural element so that the combined structural elements approximate the shape of fingers emerging from said body, and;

where in said structural elements secure said body and device by exerting a force against the inner surface of the ear canal.

4. An ear canal device holder comprising:

a body which is formed by means of an injection or dipping process with distal and proximal ends, and a central duct between said ends of a size that permits a device to be substantially contained within said duct;

a structural element that is formed with said body during the injection or dipping process so that said body and said structural element are monolithic, said structural element protruding from the cross sectional center of said body in a direction that is substantially radial from the center of the cross section of the ear canal, having a cross sectional height that is greater than or equal to the distance from the nearest edge of the body to the farthest cross sectional edge of the ear canal as the body rests against the edge of the ear canal, having a thickness and strength that will secure the weight of the device within the ear, having a length that is approximately the length of said body, and having a circumferential angular extent of less than 1π radians about the cross-sectional center of said body and of said ear canal;

where in said structural element secures said body and any device contained in the duct of said body by exerting a force against the inner surface of the ear canal that opposes an equal but opposite force on the body against the surface of the inner ear;

where in said integral structural element and body can be freely inserted into an external ear canal of the user and become wedged in the canal as the body and structural element press against the inner surface of the ear canal; and wherein because of the less than 1π radians circumferential angular extent of said structural element, ample room is provided for sound to travel in said ear canal past said monolithic structural element and body, and past any device contained within said body.

5. The ear canal device holder as defined in claim 4 wherein said device holder further comprises:

an additional integrally formed structural element also formed during the injection or dipping process so that the combined structural elements and body are monolithic and so that said structural elements protrude from said body in a direction that is substantially radial from the center of the cross section of the ear canal, to an equal distance that is greater than or equal to the distance to the inner ear canal such that said integral structural elements and body are held tight and secure within the ear canal.

6. The ear canal device holder as defined in claim 4 wherein said device holder further comprises:

an additional structural element so that the length the combined structural elements approximate the shape of fingers emerging from said body;

where in said structural elements secure said body and any device contained within the cut of the body by exerting a force against the inner surface of the ear canal.

7. An ear canal device holder comprising:

a body that is formed by means of an injection or dipping process with an inserted device that is significantly longitudinal in the direction of the ear canal when the body is inserted in the ear canal so as to minimize the cross sectional area of the ear canal that is occupied by the body and its inserted device;

a structural membrane that is formed with said body during the injection or dipping process so that said body and said structural membrane are monolithic and so that said structural membrane protrudes from said body in opposite perpendicular directions to the radius of the cross-sectional center of the ear canal at a location that is substantially along the edge of said body so that said body is centered longitudinally on said membrane;

where in said membrane has a width that does not exceed the circumference of a horizontal direction of the user's inner ear canal, a length that is approximately equal to the length of said body, and a thickness that is sufficient to produce a force on the canal of the inner ear when said membrane is inserted into the ear canal;

where in said structural membrane is formed in a substantial flat position; and where in the structural membrane retains a memory of said position and tends toward it, so that the device and body are held by the force of the membrane trying to reach its original position after it has been inserted into the ear canal of the user.

* * * * *